(12) United States Patent
Stancheva et al.

(10) Patent No.: US 7,584,355 B1
(45) Date of Patent: Sep. 1, 2009

(54) AUTHENTICATION SERVICE SCHEMES

(75) Inventors: Svetlana Stancheva, Ajtos (BG);
Stephan Zlatarev, Stara Zagora (BG);
Maria Jurova, Sofia (BG); Hiltrud Jaeschke, Muenster (DE); Jako Blagoev, Varna (BG)

(73) Assignee: SAP AG, Walldorf (DE)

( * ) Notice: Subject to any disclaimer, the term of this patent is extended or adjusted under 35 U.S.C. 154(b) by 898 days.

(21) Appl. No.: 10/836,937

(22) Filed: Apr. 30, 2004

(51) Int. Cl.
*H04L 9/32* (2006.01)
*H04L 29/06* (2006.01)
*H04L 29/02* (2006.01)

(52) U.S. Cl. .................. 713/168; 713/193

(58) Field of Classification Search ......... 713/193–194, 713/161
See application file for complete search history.

(56) References Cited

U.S. PATENT DOCUMENTS 6,789,192 B2 * 9/2004 Hirota et al. ............ 713/172
7,054,990 B1 * 5/2006 Tamura et al. ............ 711/103
2004/0117309 A1 * 6/2004 Inoue et al. ............... 705/50

* cited by examiner

*Primary Examiner*—Gilberto Barron, Jr.
*Assistant Examiner*—Venkat Perungavoor
(74) *Attorney, Agent, or Firm*—Schwegman, Lundberg & Woessner, P.A.

(57) ABSTRACT

Improved authentication service schemes are described. A first technique enables application specific authentication services even if container-wide authentication services are made available. A second technique prevents an authentication service from being performed if an attempt is made to reach an item of insensitivity within a protected area. A third technique introduces "get/set" functions into a login module callback handler arrangement for retrieving/imposing information from/to a communication session with a user that the login module is authenticating. A fourth technique distributes a login context function so that a network resides between separate portions of the login context function. A fifth technique uses a fallback handler in an application based authentication service so that a container-wide authentication service can be used.

24 Claims, 9 Drawing Sheets

AUTHENTICATION SERVICE SCHEMES

FIELD OF INVENTION

The field of invention relates generally to the software arts; and, more specifically, to improved authentication service schemes.

BACKGROUND

Authentication is the process of verifying that a person or thing (e.g., computing system) is the person or thing that he/she/it claims to be. Authentication is used to ensure that from amongst all the persons and/or things that request access to specific items of software (e.g., applications, data files, etc.) only those persons or things that are approved to have such access are actually granted such access. The classic example of an authentication service is a module of software designed to ask a client for a userid and password.

Different types of authentication processes and procedures exist (e.g., RDBMS, Kerberos, Biometric Authentication, Unix Authentication, Windows NT authentication, etc.). FIG. 1 shows an architecture that is capable of performing a particular type of authentication process from amongst a plurality of available authentication services. According to the architecture of FIG. 1, in response to a user's attempt to use an application 101, an authentication service 102 is invoked to verify the identity of the user. The authentication service 102 includes a login context 103 and a collection of login modules 104.

The login context knows or understands which login module amongst login modules $104_1$ through $104_N$, is appropriate for the situation; and, causes the appropriate login module to be used to authenticate the user. Here, each login module can be viewed as corresponding to a different type of authentication process. For example, login module $104_1$ is a module of software for executing RDBMS authentication processes, login module $104_2$ is a module of software for executing Kerberos authentication processes, login module $104_3$ is a module for software for executing Biometric authentication processes, etc. If the login context 103 views Kerberos authentication procedures to be appropriate for the situation, the login context 103 invokes the Kerberos authentication module $104_2$ to authenticate the user.

An invoked login module executes its specific type of authentication process (e.g., with the help of a callback handler (not shown in FIG. 1), asks for a userid and password in accordance with a specific format). If it is determined that the user has provided acceptable credentials to very himself/herself/it, and if the verified user has been cleared for access, a favorable response is sent to the login context 103 by the invoked login module. The login context 103, in turn, favorably reports to whatever entity initially requested the services of the authentication service 102.

In one type of approach, a separate "user manager" service (also referred to as an "authorization" service), which is not shown in FIG. 1 for illustrative ease, keeps track of which users are permitted to reach which applications. Therefore, once the login module has verified the identity of a user, it passes the identity of the user to the user manager service. The user manager service verifies whether or not the user has the authority to reach the application that triggered the authentication procedures. If the user does not have authority, the login module is told as much by the user manager and an unfavorable response is forwarded up to the login context 103 and then up from the login context 103.

If the user does have the authority, the login module is told as much by the user manager and a favorable response is sent to the login context 103 and beyond. Often, "principle information" is created for the user that is based on the authentication information collected by the login module (e.g., the user's password). Principle information is any information that identifies a user. Authorization (i.e., the process of determining whether or not a user has the authority to reach a protected area of software) is performed by correlating the user's principle information to the protected areas the user has been approved for access to.

FIG. 1 suggests that a particular application 101 invokes the authentication service 102. Although this is possible it is not necessarily the case. For example, a user's attempt to enter the container 100 within which the application resides may be sufficient to trigger the authentication service, the location of the user may be sufficient to trigger the authentication service, etc. The application 101 may be various forms of applied software such as, for example, a business logic application, a page, a servlet, one or more files (or software to fetch one or more files), etc.

A container 100 is shown in FIG. 1 as well. A container 100 is typically used to collect a plurality of applications. Here, the authentication service 102 is provided by the container itself for the use of its applications (and, as such, may be referred to as a "container-wide" authentication service). The security service's ability to invoke different types of authentication schemes is useful because the container's different applications may cause a need for different authentication schemes (e.g., a first application requires the use of a first type of authentication scheme, a second application requires the use of a second type of authentication service, etc.).

FIGURES

A better understanding of the present invention can be obtained from the following detailed description in conjunctions with the following drawings, in which.

SUMMARY

Improved authentication service schemes are described. A first technique enables application specific authentication services even if container-wide authentication services are made available. A second technique prevents an authentication service from being performed if an attempt is made to reach an item of insensitivity within a protected area. A third technique introduces "get/set" functions into a login module callback handler arrangement for retrieving/imposing information from/to a communication session with a user that the login module is authenticating. A fourth technique distributes a login context function so that a network resides between separate portions of the login context function. A fifth technique uses a fallback handler in an application based authentication service so that a container-wide authentication service can be used.

DETAILED DESCRIPTION

Figure 1:
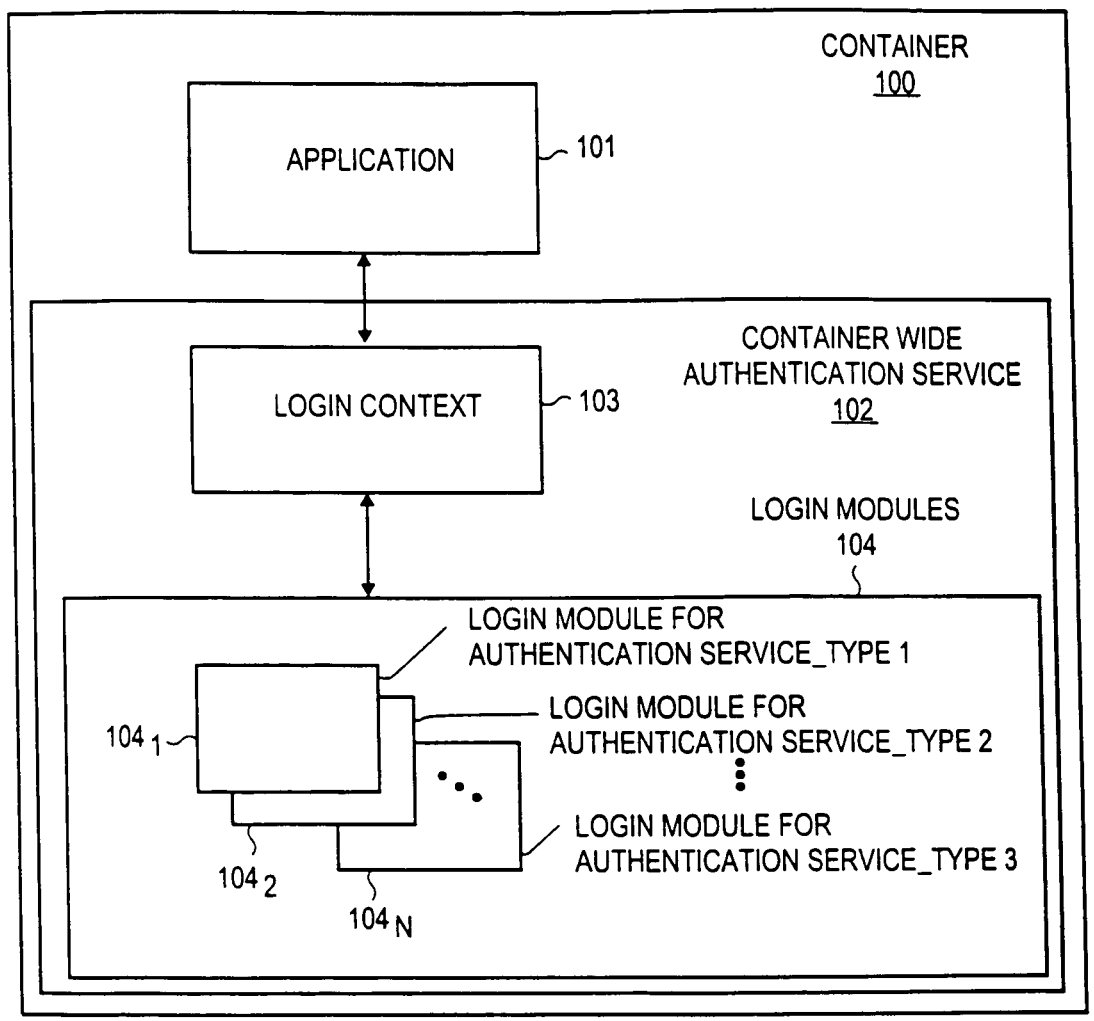
FIG. 1 (prior art) shows an authentication service.
Figure 2:
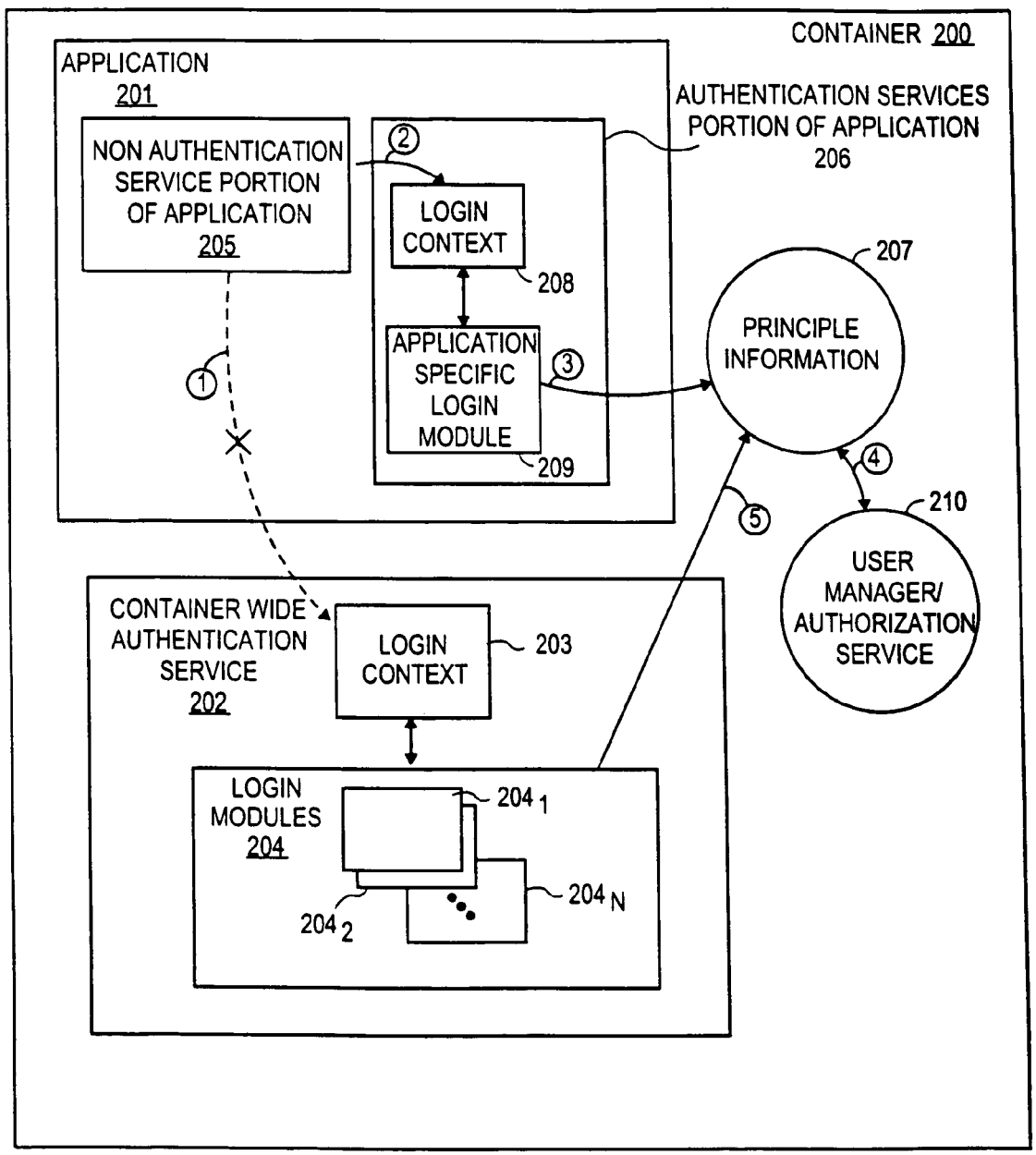
FIG. 2 shows an improved authentication service having both a container wide authentication service and an application specific authentication service.

FIG. 2 shows an improved authentication service having both a container wide authentication service 202 and an application specific authentication service 206. An application specific authentication service could be used, for example, to support authentication process that are unique to the application 201. That is, in contrast to a situation where an application needs an industry standard authentication process (e.g., Kerberos) which is apt to be found in the container wide authentication service 202, the application specific authentication service is useful at least in those circumstances where an application 201 needs "its own" unique authentication procedures. In such a situation it makes sense that the authentication service 206 that is used by the application 201 be made part of the application 201 itself.

FIG. 2 therefore shows an application having a portion 205 that is not devoted to an application service (e.g., the portion containing the substantive methods and/or data for which the application is used) and a portion that corresponds to its own authentication service 206. An issue with implementing an application specific authentication service 206 is cohesive operation of the overall container 200 in light of the fact that the container already has a authentication service 202. That is, care should be taken that the presence of one authentication service does not adversely impact the operation of the other authentication service or the operation of any of the methods contained by the container 200.

Therefore, in an embodiment, certain policy rules are built into the operation of the container 200 so as to avoid any problems caused by performing authentication services with an application 201 rather than the container wide authentication service 202. An embodiment of a set of designed in policy rules are as follows:

1) any authentication (and any authorization that may result from the authentication) performed by the container-wide authorization service 202 must be accepted by the application 201;

2) any authentication (and any authorization that may result from the authentication) performed by the application based authentication service 206 must be accepted by the rest of the container 200 (which the container wide authentication service 202 is deemed part of);

3) if the container-wide authorization service 202 performs an authentication for the application 201 for a particular user, the application based authentication service 206 cannot perform authentication of the same user for the application 201; and, 4) if the application based authentication service 206 authenticates a user for the application 201, the application 201 is responsible for ensuring that the user is authorized to reach the application 201 (e.g., the application communicates principle information to the user manager 210).

The above policies essentially impose a mutual respect between the container 200 and the application 201 as to their corresponding authentication services.

Another feature is to ensure that principle information gained from either authentication service is forwarded to a common location 207 for the use of the user manager/authorization service 210. Here, it is possible different items of principle information may build up for the same user over the course of different authentication schemes. That is, for example, a first authentication process may request a user's email address; and, another authentication process may request a userid and password from the same user.

Because one of these authentication processes may be performed by the application based authentication service 206 and another of these authentication processes may be performed by the container wide authentication service 202 (e.g., through the user's initial attempt to enter the container or the user's attempt to reach another application within the container), efficiencies may be realized by keeping track of all the principal information for the same user at a common location so the authorization service 210 can be centralized. Any other uses of principle information may be made more efficient by combining all principle information for a same user at a centralized location.

An exemplary set of sequences helps to illustrate this feature along with at least some of the rules outlined above. According to the example of FIG. 2, the need for a user's authentication is triggered by the user's attempt to reach application 201. In a particular embodiment, this causes a general request for authentication service which is typically responded to (at least in the case of applications that do not have their own authentication service) by the container-wide authentication service 202. Any such interpretation that the container-wide authentication service 202 is to respond the request, or any response by the container-wide authentication service 202 to the general request made by the application 201 is blocked, squelched or otherwise unaffected 1, and, instead, is interpreted as a request 2 being made to the application's own authentication service 206.

In the embodiment of FIG. 2, the application's authentication service 206 includes a login context 208 and at least one login module. The login context 208 is designed to know or determine the appropriate login module 209 to use under the circumstances. In various embodiments it is expected that a login module contained by an application will execute authentication procedures that are unique to the application (or at least a limited selection of applications). The appropriate login module 209 executes its authentication procedures and forwards 3 any information that is to be tracked as principle information for the user (e.g., a userid) to some entity 207 (e.g., an object) whose purpose includes keeping track of the user's principle information.

This information is then used by an authorization service 210 which determines whether or not the user is allowed to reach the application 201 and reports its conclusion to the application 201 (e.g., to the login module 209). Some time later the same user may try to reach another application within the container 200; which, in turn, causes the container-wide authentication service 202 to be invoked. Here, at least any new principle information for the user is forwarded 5 by the appropriate login module (e.g., any one of login modules $204_1$ through $204_N$) to the centralized entity 207 that stores the user's principle information. The authorization service 210 then determines whether or not the user is allowed to reach the second application.

Figure 3:
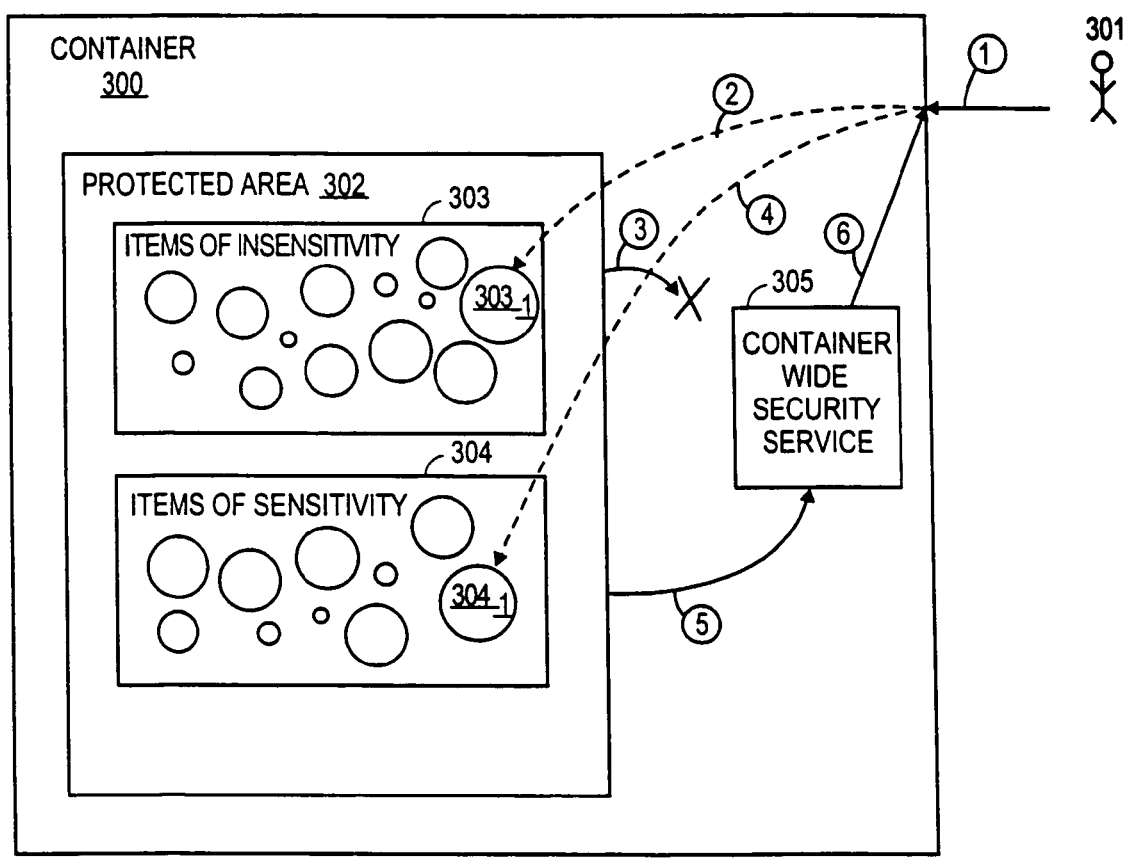
FIG. 3 shows an improved authentication service capable of triggering authentication on the selection of sensitive material within a protected area.

FIG. 3 shows an improved authentication service capable of triggering authentication on the selection of sensitive material within a protected area 302. Often a protected area 302 is defined within a container 300 that requires a user 301 who desires access to the protected area 302 to be authenticated for entry to the protected area 302 before the user 301 is allowed access to any of the items (e.g., applications) that reside within the protected area 302. Often times, not all of the items within the protected area 302 are sensitive so as to require authentication. Such items may be referred to as items of insensitivity 303. That is, perhaps because of some tight relationship with items 304 that are sensitive and do require authentication prior to access (i.e., items of sensitivity 304) and/or because of the underlying mechanics/requirements of defining a protected area 302, items of insensitivity 303 are nevertheless included within a protected area 302 that is designed largely to protect only the items of sensitivity 304.

Since prior art solutions trigger authentication on a user's attempt to enter the protected area 302 (i.e., prior art solutions trigger authentication on a user's attempt to enter the protected area 302 irrespective of whether the user 301 is attempting to reach an item of insensitivity or an item of sensitivity), inefficiency can result—particularly if attempts to reach the items of insensitivity 303 are frequently made. That is, even though authentication is not necessary often times in terms of the sensitivity of the items being reached, authentication services is nevertheless frequently performed.

A solution is to actually impose authentication services only if an attempt is made to reach items of sensitivity 304 within a protected area 302. As such, if an attempt is made to reach items of insensitivity 303 within the protected area 302, authentication services are not actually imposed. FIG. 3 demonstrates an exemplary process for instituting such an approach.

According to the example of FIG. 3, it is assumed that a defined protected area 302 has been defined around both items of insensitivity 303 and items of sensitivity 304. A user's attempt to breach the protected area 302 for purposes of reaching 2 an item 303, of insensitivity triggers some form of request 3 for authentication services 3. Here, a "security service" 305 is observed in FIG. 3 that is capable of performing authentication and/or authorization services. Because it is recognized that an attempt to reach an item of insensitivity is being made 2, the request 3 for the services of the security service 305 (or an attempt by the security service 305 to responds to the request 3) is squelched, decommissioned or otherwise made ultimately ineffectual. As such, the user 301 is permitted to reach the item of insensitivity 303, without authentication being actually imposed.

If the user 301 attempts to breach the protected area 302 for purposes of reaching 4 an item 304, of sensitivity, a request 5 for authentication services is made that ultimately is responded to by the security service 305. That is, rather than causing a response for security services to be made ultimately ineffectual (as is the case for attempts to reach an item of insensitivity), a response for security services results in authentication services being performed. Thus an attempt to reach an item of insensitivity does not result in the imposition of security services but an attempt to reach an item insensitivity does result in the imposition of security services. In an embodiment, a list is associated with the protected area 302 that lists those items that are sensitive 304 and/or those items that are insensitive 303. Thus, by referencing such a list and with knowledge of the specific item that an attempt to reach is being made for, the decision whether to squelch security services or let them flow can be easily made.

It is to be understood that in practical situations the user may be attempting to breach the protected area 302 as part of a same communication session over a network (e.g., an HTTP session). As such, attempts to reach multiple items within the protected area 302 may be made as part of the same continuous communication. Note that in such circumstances, until the first attempt is made to reach an item of sensitivity, no security services are performed. Once the first attempt to reach an item of sensitivity during the communication session is made, security services are performed. In an embodiment, subsequent attempts to reach the same or different items of sensitivity during the communication session result in no new attempts at authorization and authentication.

Figure 4:
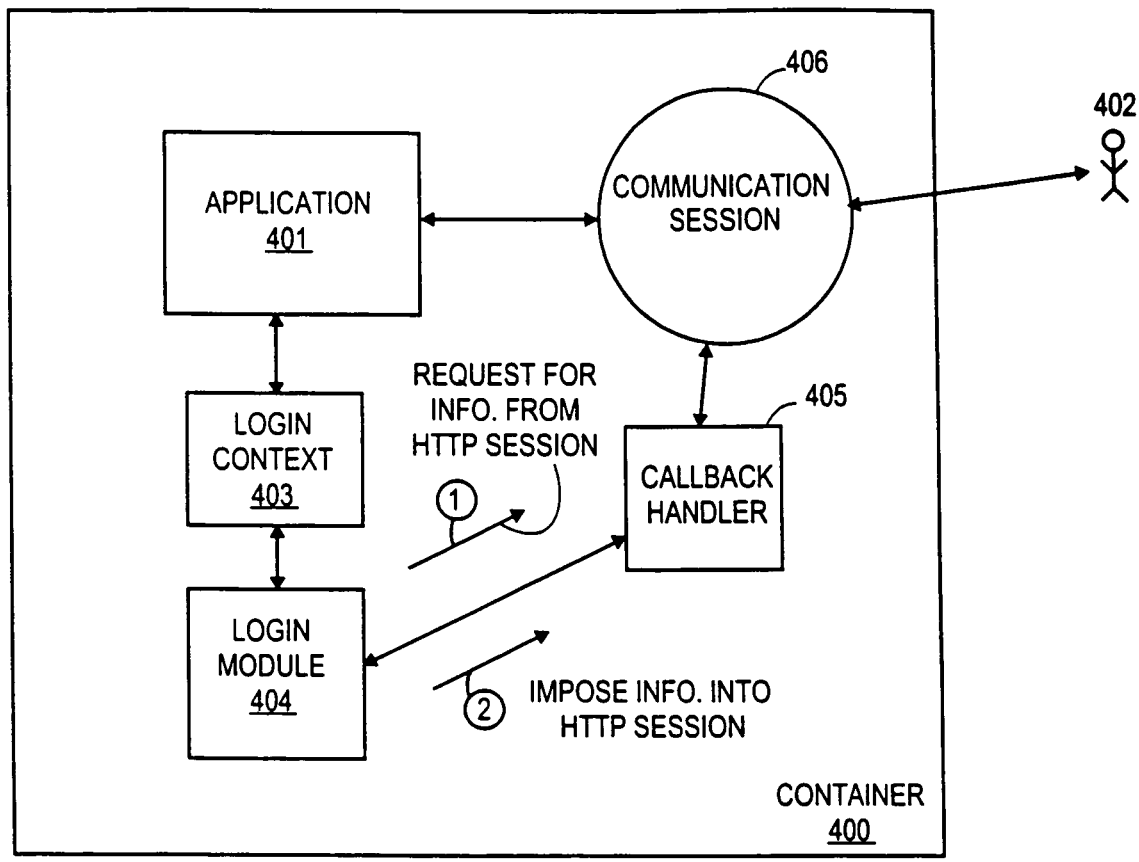
FIG. 4 shows an improved authentication service capable of retrieving and importing information from/to a communication session.

FIG. 4 shows an improved authentication service capable of retrieving and importing information from/to a communication session (such as an HTTP session). According to know prior art techniques, login modules used only basic "stripped down" functions concerning the login module's use of the callback handler. More specifically, the login module was only capable of invoking the callback handler to control the sending of simplistic requests to a user (e.g., a request for a userid and a password).

Here, callback handlers and login modules were not designed so as to permit a login module to request information concerning a communication session with a user that is attempting to reach an application that the login module is performing security services on behalf of. Nor were callback handlers and login modules designed so as to permit a callback handler to impose information into a communication session other than basic requests for authentication information from a user.

FIG. 4 shows an improved approach where the login module and callback handler are capable of performing either of the functions described. That is, the login module 404 is capable of requesting the callback handler 405 (and the callback handler 405 is capable of fetching) information concerning the communication session itself. As such, specific "get" functions are installed in the callback handler 405 that the login module calls 404 calls upon 1. Examples for an HTTP session include: 1) get information found in a header of a packet sent over the HTTP session by the user; 2) get a cookie from the user; 3) get a user certificate (or certificate chain); 4) get the user IP address; 5) get an HTTP method performed in response to a request; 6) get the type of transport mechanism being used (e.g., secure or not); 7) get the request body of an HTTP session; 8) get a specific session attribute of an HTTP session; 9) get all session attributes of an HTTP session.

In order to import a certain amount of control or information into an HTTP session from a login module the following "set" functions can be be installed into a callback handler 405 that may be called upon 2 by the login module 404: 1) set information in a header of a packet to be sent to the user over the HTTP session; 2) set (send) a cookie to the user; 3) set the type of transport mechanism that is to be used by the HTTP session; 4) set the response code for the HTTP session; 5) set a specific HTTP session attribute.

Any up to all of these functions being built into the login module 404 and callback handler 405 allows the login module 404 to perform more sophisticated authentication services than has heretofore been capable through information retrieved/imposed through the callback handler 405. For simplicity, an object 406 that represents a communication session is shown in FIG. 4. The object 406 is capable of actually implementing get/set commands sent from the callback handler 405. Note that a client in a client/server environment is one type of "user". The embodiment of FIG. 4 shows a login context 403 that has determined that login module 404 is appropriate in the circumstances surrounding the attempt of user 402 to reach application 401.

Figure 5A:
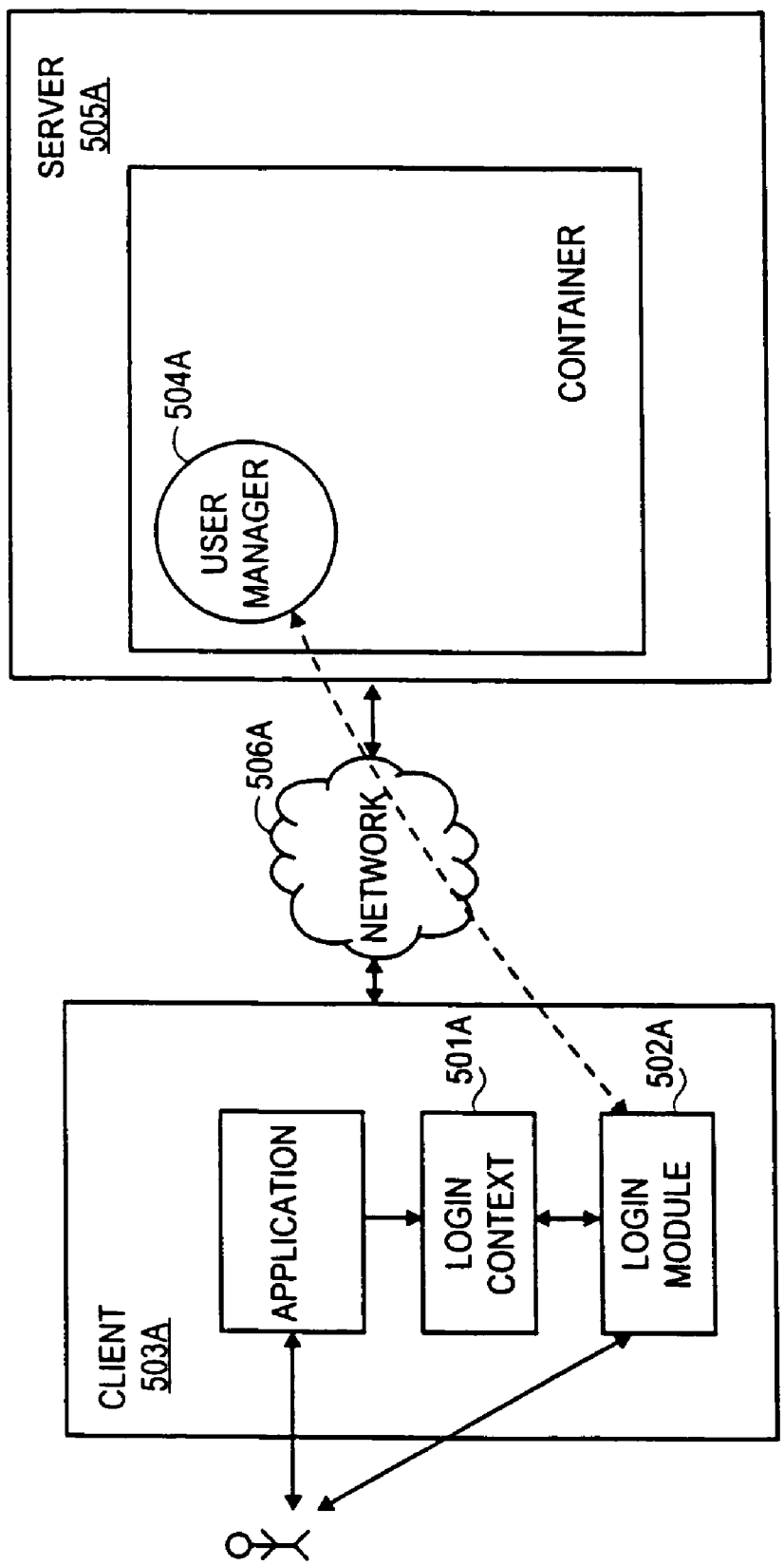
FIGS. 5a and 5b (prior art) show prior art authentication service schemes implemented within a client-server environment.
Figure 5B:
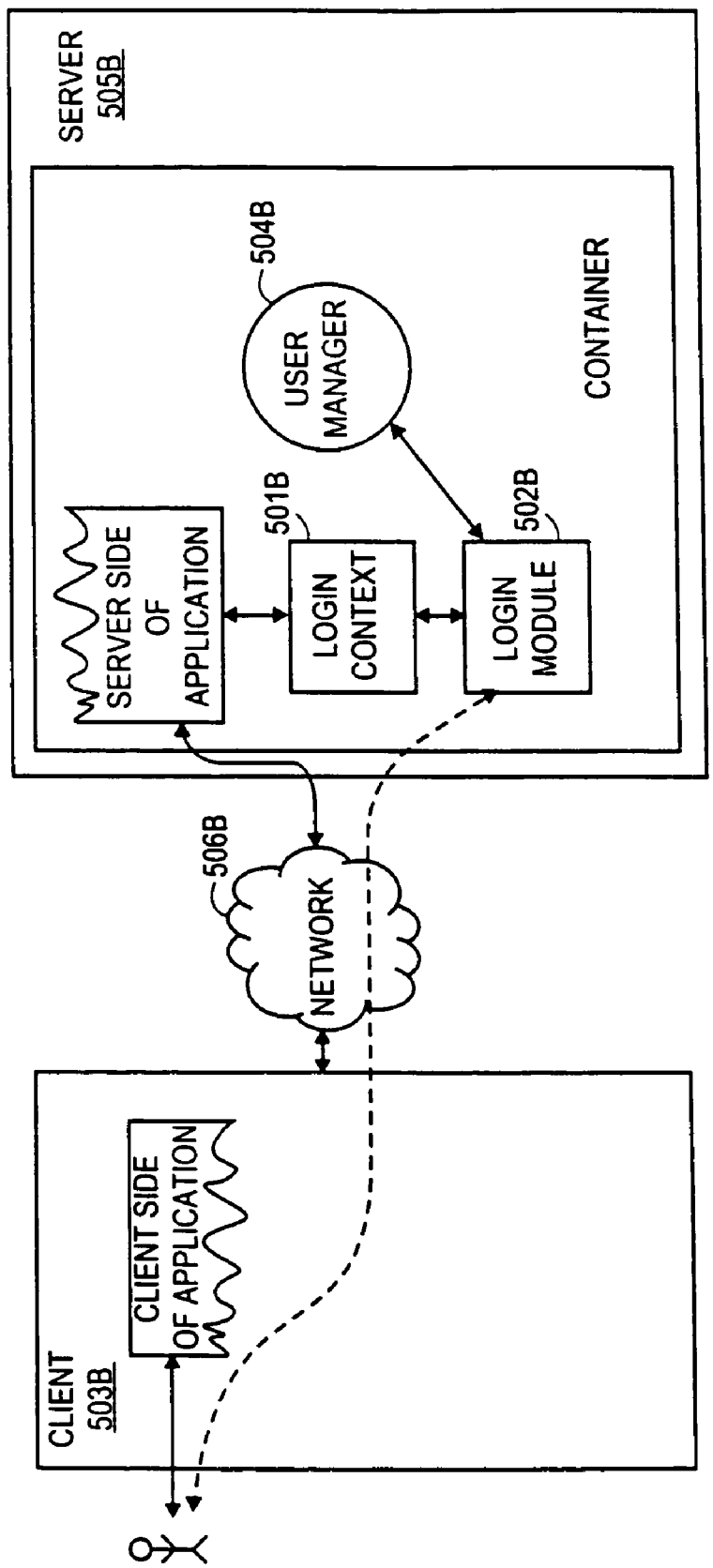

FIGS. 5a and 5b show prior art authentication service schemes implemented within a client-server environment. According to the scheme of FIG. 5a, both the login context 501a and login module 502a reside on the client 503a while the authentication service (the user manager 504a) resides on the server 505a. As such, the login module 502a communicates with the user manager 504a through the network 506a separating the client 503a and server 505a. According to the scheme of FIG. 5b, the login context 501b, the login module 502b and the user manager 504b are on the server 505b. As such, the application's own internal communications and the authentication process that transpires between the login module 502b and the user cross the network 506b that separates the client 503b and the server 505b.

Figure 5C:
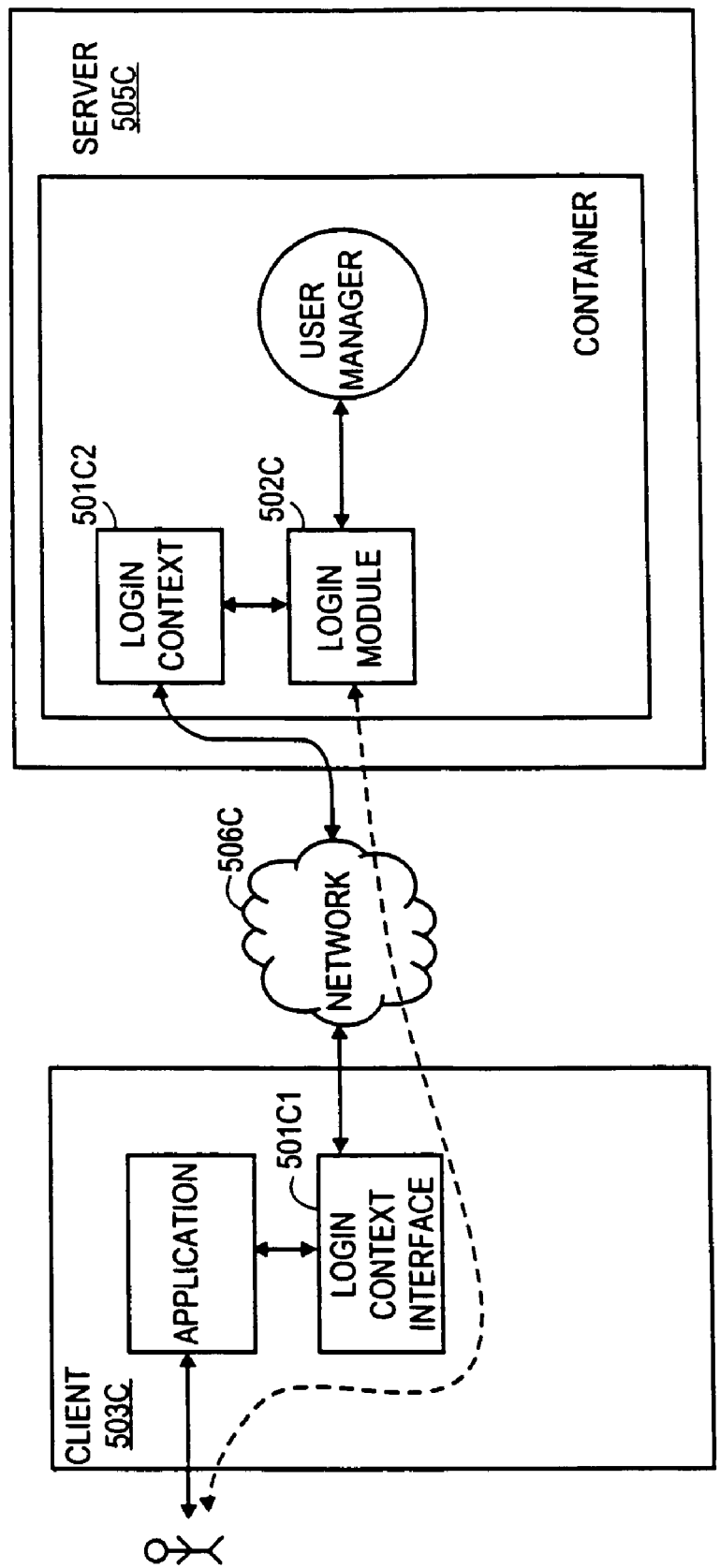
FIG. 5c shows an improved authentication service architecture having a distributed login context.

FIG. 5c shows another approach where the login context itself is distributed such that a first portion 501c1 resides on the client 503c and a second portion 501c2 resides on the server 505c. As such, the login context's own internal communications cross the network 506c that separates the client 503c and the server 505c. In a further embodiment, the portion 501c1 of the login context that resides on the client is a stub or skeleton that behaves as an interface for the portion of the login context 501c2 that resides on the server 505c. Here, a communication protocol suitable for implementing distributed software functions (such as RMI, CORBA, MXL based SOAP, a proprietary protocol) can be used to support the internal communications between the login context portions 501c1, 501c2 over network 506c. At some point, in an embodiment, the login context portion 501c1 that resides on the client is sent to the client by the server 505c.

In an embodiment, the stub or skeleton 501c1 that resides on the client 503c converts application invocations of the login context 501c1 (e.g., by using function calls offered to the application by the login context) on the client side into messages that are sent over the network 506c to the server side portion of the login context 501c2. For example, if the application requests authentication service, a function call of some sort is made to the login context portion 501c1 that resides on the client 503c. This login context portion 501c1 sends in response a message over the network 506c to the server side portion of the login context 501c2.

In an embodiment, the message identifies the application and/or other relevant information that may be used to determine which login module is appropriate for use. The login context portion 501c2 on the server decides which login module is appropriate and invokes its use. The selected login module 502c then performs its authentication processes over the network 506c to the user. A favorable or unfavorable decision is determined on the server side and the login context 501c2 on the server side is provided notice of this decision. The decision is then formatted according to a distributed software communication protocol and sent over the network 506c to the login context portion 501c1 on the client. The client side portion of the login context 501c1 then informs the application of the decision.

Figure 6:
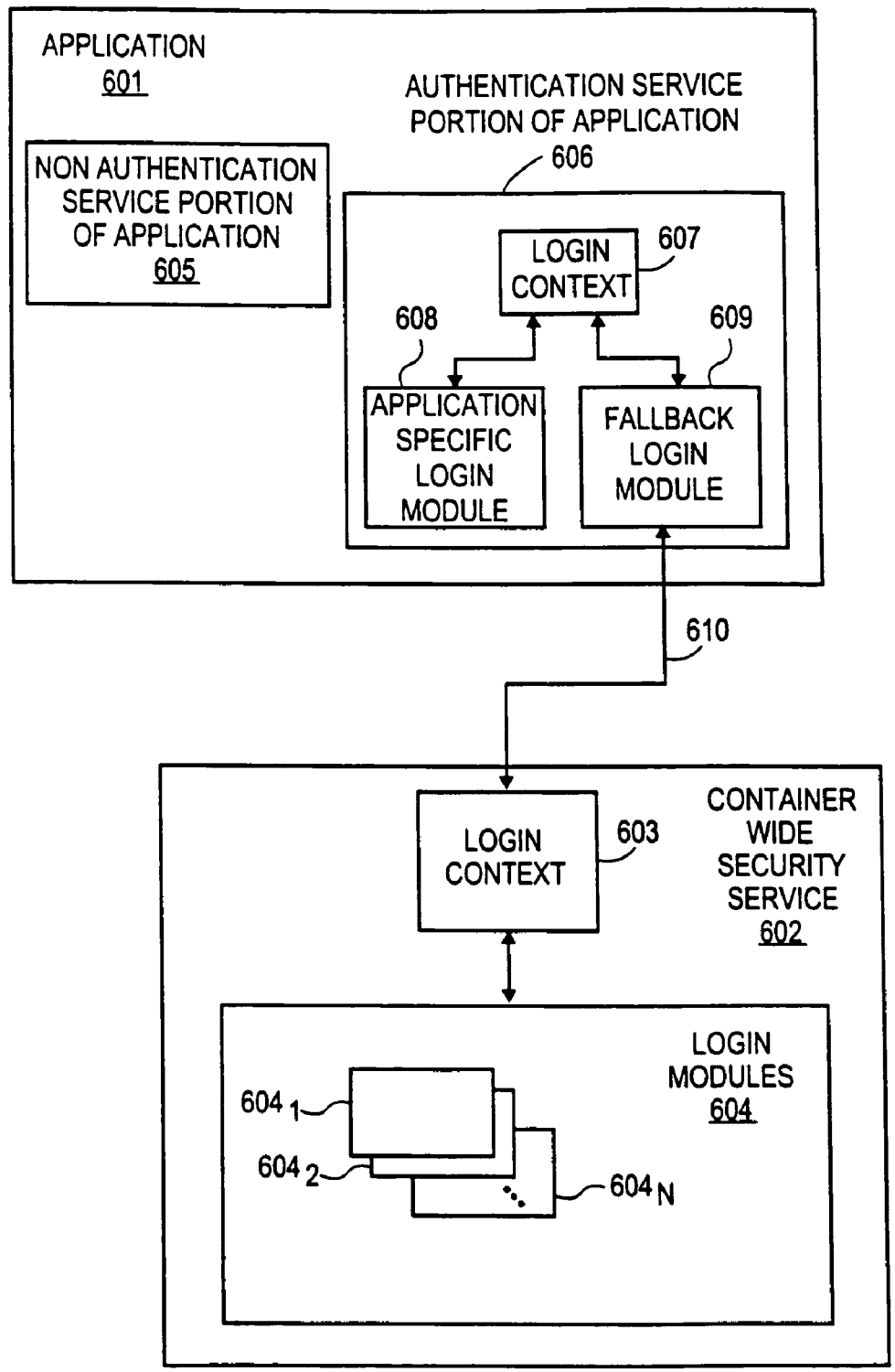
FIG. 6 shows an improved authentication service architecture having both a container wide authentication service and an application specific authentication service where the application specific authentication service is capable of using a container wide authentication service.

FIG. 6 shows an improved authentication service architecture having both a container wide authentication service and an application specific authentication service where the application specific authentication service is capable of using a container wide authentication service. FIG. 6 can be viewed as an extension to the teachings discussed with respect to FIG. 2. Here, an application based authentication service 606 is viewed as having both a login module 608 that performs authentication procedures that are unique to the application (and perhaps a selection of other applications); and, a "fallback" login module 609 that behaves as a reference to the login context 603 of the container-wide authentication service 602.

The architecture of FIG. 6 allows the application 601 to benefit from the authentication process techniques executed by the login modules $604_1$ through $604_N$ of the container wide service 602; while, also benefiting from a specific authentication process executed by the application specific login module 608. That is, if the login context 607 of the application based authentication service 606 determines that the application specific authentication process is appropriate, the application specific login module 608 is invoked; or, if the login context 607 determines that some other authentication service process that the container wide service 602 offers is appropriate module 609 is invoked. Invoking module 609 simply causes the container wide service to be used.

The container wide service can either determine from its own login context which of its modules $604_1$ through $604_N$ are appropriate; or, can be told by the application's login context 608 through the communication sent to the container wide service 602 by the fallback login module 609.

Note that the various teaching discussed above with respect to FIGS. 1 through 6 may be combined in various combinations with each other. Specifically, any of the teachings associated with discussions of FIGS. 2, 3, 4, 5c and 6 may be combined with any other teachings associated with discussion 2, 3, 4, 5c and 6.

Any of the servers discussed above may be implemented as Java 2 Enterprise Edition ("J2EE") server nodes which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
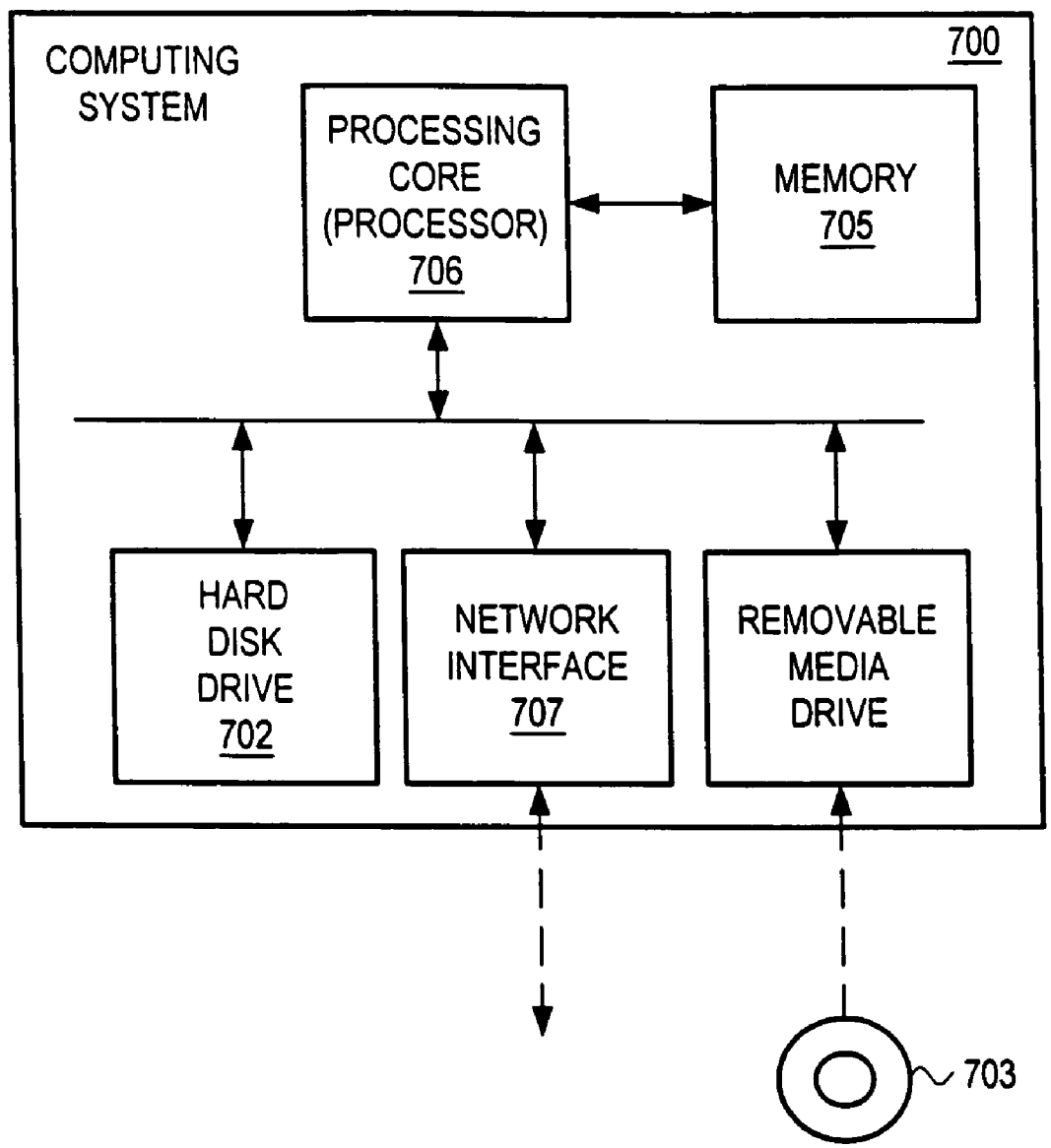
FIG. 7 shows a computing system.

FIG. 7 is a block diagram of a computing system 700, such as a server, that can execute program code stored by an article of manufacture. It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    reading program code from memory and processing said program code with one or more processors to perform the following:
    during a communication session, controlling access to a protected area, said controlling comprising:
    detecting a first attempt to reach said protected area;
    generating a first request for authentication service in response to said detecting of the first attempt;
    recognizing that said first attempt desires to reach an item of insensitivity within said protected area;
    in response to said recognizing, permitting said first attempt to reach said item of insensitivity within said protected area by preventing said authentication service from responding to said first request;
    detecting a second attempt to reach said protected area;
    generating a second request for authentication service in response to said detecting of the second attempt;
    recognizing that said second attempt desires to reach an item of sensitivity within said protected area;
    performing said authentication service in response to said recognizing that said second item desires to reach said item of sensitivity within said protected area.

2. The method of claim 1 wherein said communication session is an HTTP session.

3. The method of claim 2 wherein, in order to determine that said preventing is appropriate, referring to a list that identifies said item of insensitivity.

4. The method of claim 2 wherein, in order to determine that said performing is appropriate, referring to a list that identifies said item of sensitivity.

5. The method of claim 2 wherein said method further comprises performing an authorization service after said performing of said authentication service.

6. The method of claim 1 wherein, in order to determine that said preventing is appropriate, referring to a list that identifies said item of insensitivity.

7. The method of claim 1 wherein, in order to determine that said performing is appropriate, referring to a list that identifies said item of sensitivity.

8. The method of claim 1 wherein said method further comprises performing an authorization service after said performing of said authentication service.

9. An article of manufacture including program code stored on a machine readable storage medium which, when executed by a machine, causes the machine to perform a method, the method comprising:
    reading program code from memory and processing said program code with one or more processors to perform the following:
    during a communication session, controlling access to a protected area, said controlling comprising:
    detecting a first attempt to reach said protected area;
    generating a first request for authentication service in response to said detecting of the first attempt;
    recognizing that said first attempt desires to reach an item of insensitivity within said protected area;
    in response to said recognizing, permitting said first attempt to reach said item of insensitivity within said protected area by preventing said authentication service from responding to said first request;
    detecting a second attempt to reach said protected area;
    generating a second request for authentication service in response to said detecting of the second attempt;
    recognizing that said second attempt desires to reach an item of sensitivity within said protected area;
    performing said authentication service in response to said recognizing that said second item desires to reach said item of sensitivity within said protected area.

10. The article of manufacture of claim 9 wherein said communication session is an HTTP session.

11. The article of manufacture of claim 10 wherein, in order to determine that said preventing is appropriate, referring to a list that identifies said item of insensitivity.

12. The article of manufacture of claim 10 wherein, in order to determine that said performing is appropriate, referring to a list that identifies said item of sensitivity.

13. The article of manufacture of claim 10 wherein said method further comprises performing an authorization service after said performing of said authentication service.

14. The article of manufacture of claim 9 wherein, in order to determine that said preventing is appropriate, referring to a list that identifies said item of insensitivity.

15. The article of manufacture of claim 9 wherein, in order to determine that said performing is appropriate, referring to a list that identifies said item of sensitivity.

16. The article of manufacture of claim 9 wherein said method further comprises performing an authorization service after said performing of said authentication service.

17. A computing system comprising instructions disposed on a computer readable storage medium, said instructions capable of being executed by said computing system to perform a method, said method comprising:
    reading program code from memory and processing said program code with one or more processors to perform the following:
    during a communication session, controlling access to a protected area, said controlling comprising:
    detecting a first attempt to reach said protected area;
    generating a first request for authentication service in response to said detecting of the first attempt;
    recognizing that said first attempt desires to reach an item of insensitivity within said protected area;
    in response to said recognizing, permitting said first attempt to reach said item of insensitivity within said protected area by preventing said authentication service from responding to said first request;
    detecting a second attempt to reach said protected area;
    generating a second request for authentication service in response to said detecting of the second attempt;

recognizing that said second attempt desires to reach an item of sensitivity within said protected area;

performing said authentication service in response to said recognizing that said second item desires to reach said item of sensitivity within said protected area.

18. The computing system of claim 17 wherein said communication session is an HTTP session.

19. The computing system of claim 18 wherein, in order to determine that said preventing is appropriate, referring to a list that identifies said item of insensitivity.

20. The computing system of claim 18 wherein, in order to determine that said performing is appropriate, referring to a list that identifies said item of sensitivity.

21. The computing system of claim 18 wherein said method further comprises performing an authorization service after said performing of said authentication service.

22. The computing system of claim 17 wherein, in order to determine that said preventing is appropriate, referring to a list that identifies said item of insensitivity.

23. The computing system of claim 17 wherein, in order to determine that said performing is appropriate, referring to a list that identifies said item of sensitivity.

24. The computing system of claim 17 wherein said method further comprises performing an authorization service after said performing of said authentication service.

* * * * *

UNITED STATES PATENT AND TRADEMARK OFFICE
CERTIFICATE OF CORRECTION

PATENT NO.        : 7,584,355 B1                                    Page 1 of 1
APPLICATION NO.   : 10/836937
DATED             : September 1, 2009
INVENTOR(S)       : Stancheva et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this

Fourteenth Day of September, 2010

David J. Kappos
*Director of the United States Patent and Trademark Office*